(12) United States Patent
Schönenberger

(10) Patent No.: US 11,737,594 B2
(45) Date of Patent: Aug. 29, 2023

(54) APPARATUS FOR COOKING AT LEAST TWO FOODSTUFFS

(71) Applicant: V-Zug AG, Zug (CH)

(72) Inventor: Marc Schönenberger, Zürich (CH)

(73) Assignee: V-Zug AG, Zug (CH)

( * ) Notice: Subject to any disclaimer, the term of this patent is extended or adjusted under 35 U.S.C. 154(b) by 1049 days.

(21) Appl. No.: 15/898,282

(22) Filed: Feb. 16, 2018

(65) Prior Publication Data

US 2018/0235396 A1 Aug. 23, 2018

(30) Foreign Application Priority Data

Feb. 20, 2017 (EP) .................................... 17000266

(51) Int. Cl.
*A47J 27/12* (2006.01)
*F24C 11/00* (2006.01)
*F24C 7/08* (2006.01)
*G05B 15/02* (2006.01)
*A47J 27/04* (2006.01)
*H05B 6/06* (2006.01)
*H05B 6/64* (2006.01)

(52) U.S. Cl.
CPC ............... *A47J 27/12* (2013.01); *F24C 7/082* (2013.01); *F24C 11/00* (2013.01); *G05B 15/02* (2013.01); *A47J 27/04* (2013.01); *A47J 2027/043* (2013.01); *H05B 6/062* (2013.01); *H05B 6/6435* (2013.01)

(58) Field of Classification Search
CPC ...... A47J 27/12; A47J 27/04; A47J 2027/043; F24C 7/082; F24C 11/00; G05B 15/02
See application file for complete search history.

(56) References Cited

U.S. PATENT DOCUMENTS

| 4,390,965 | A | | 6/1983 | Albert | |
|---|---|---|---|---|---|
| 5,171,974 | A | * | 12/1992 | Koether | F24C 7/08 219/413 |
| 5,352,874 | A | * | 10/1994 | Gong | H05B 6/6438 219/704 |

(Continued)

FOREIGN PATENT DOCUMENTS

| DE | 102005032088 A1 * | 1/2007 | ............. F24C 7/083 |
|---|---|---|---|
| DE | 102012002308 A1 * | 8/2013 | ................ F24C 7/08 |

(Continued)

OTHER PUBLICATIONS

Manitowoc Foodservice Inc., "Convotherm 4: Designed Around You," pp. 1-19 (Mar. 2014).

(Continued)

*Primary Examiner* — Steven N Leff
(74) *Attorney, Agent, or Firm* — McCormick, Paulding & Huber PLLC

(57) ABSTRACT

An apparatus comprises at least two cooking devices, a control unit, an input device and an output device. The control unit is adapted to determine if at least two of the foodstuffs to be cooked can be cooked in one of the cooking devices in an at least partly concurrent manner. Depending thereon, the control unit allocates the foodstuffs to be cooked to the cooking devices and outputs, via the output device, which of the foodstuffs can be cooked in which cooking device or in which cooking devices.

20 Claims, 1 Drawing Sheet

(56) References Cited

U.S. PATENT DOCUMENTS

| | | | | |
|---|---|---|---|---|
| 8,147,888 B2* | 4/2012 | Kling | ............... | F24C 7/08 |
| | | | | 426/233 |
| 8,342,847 B2* | 1/2013 | Do | ............... | G09B 21/00 |
| | | | | 434/127 |
| 8,992,225 B2* | 3/2015 | Do | ............... | G06F 3/016 |
| | | | | 434/127 |
| 2007/0246451 A1 | 10/2007 | Willet | | |
| 2009/0183729 A1* | 7/2009 | Barkhouse | ............... | F23N 1/002 |
| | | | | 126/39 BA |
| 2010/0132692 A1* | 6/2010 | Shaffer | ............... | A47J 37/0713 |
| | | | | 126/39 E |
| 2012/0003364 A1* | 1/2012 | Kling | ............... | F24C 7/08 |
| | | | | 426/231 |
| 2017/0156347 A1* | 6/2017 | Reese | ............... | G05B 19/106 |

FOREIGN PATENT DOCUMENTS

| | | | | | |
|---|---|---|---|---|---|
| DE | 102015103504 A1 | 9/2016 | | | |
| EP | 1882886 A2 | 1/2008 | | | |
| EP | 2213175 A1 | 8/2010 | | | |
| EP | 2775212 A1 * | 9/2014 | ............... | A23L 5/10 |
| GB | 2380923 A | 4/2003 | | | |
| WO | 2017185191 A1 | 11/2017 | | | |
| WO | 2018006182 A1 | 1/2018 | | | |

OTHER PUBLICATIONS

Eloma, "Joker Der Flexible Kompakte," pp. 1-20 (Sep. 2015) with English Translation of Pertinent Information.

Lainox Cooking System, "Heart: Cooking with the Heart," pp. 1-24 (Mar. 2010).

* cited by examiner

| | 1. Oven [°C] | 2. Steamer [°C] | 3. Microwave [W] | 4. Hob |
|---|---|---|---|---|
| Bread (1) | 220-250 | | 150-250 | |
| Meat loaf (1) | 180-220 | | | yes |
| Neck of pork (1) | 190-220 | 90-110 | | yes |
| Chicken (2) | 190-230 | 90-110 | 150-250 | yes |
| Fish fillet (2) | 180-220 | 70-90 | 450-550 | yes |
| Cauliflower (2) | | 90-110 | 450-650 | yes |
| Carrots (2) | | 90-110 | 450-650 | yes |
| Bratwurst (4) | 90 - 110 | | | yes |
| .... | | | | |

# APPARATUS FOR COOKING AT LEAST TWO FOODSTUFFS

CROSS-REFERENCE TO RELATED APPLICATION

This application claims foreign priority benefits under U.S.C. § 119 of European Patent Application No. 17 000 266.1 filed on Feb. 20, 2017, the content of which is hereby incorporated by reference in its entirety.

TECHNICAL FIELD

The invention relates to an apparatus and a method for preparing at least two foodstuffs comprising at least two cooking devices, in particular an oven, a steamer, a microwave device, a combination cooking device and/or a hob. Furthermore, the apparatus comprises an input device for specifying the at least two foodstuffs to be cooked, a control unit and an output device.

BACKGROUND ART

It is know that it is mentioned in cooking recipes which foodstuffs have to be cooked in which cooking devices. These recipes can also be stored electronically and can chronologically show to the user via a display, which is arranged at the cooking device, which foodstuff or which foodstuffs have to be placed at which time and under which cooking conditions into the respective cooking device.

SUMMARY OF THE INVENTION

The problem to be solved by the present invention is to provide an apparatus of cooking devices which simplifies the cooking of several foodstuffs.

The object is solved by the apparatus of the present invention.

According to this, in a first aspect the apparatus for preparing at least two foodstuffs comprises
at least two cooking devices,
at least one control unit with a data storage,
at least one input device for specifying the at least two foodstuffs to be cooked,
at least one output device,
wherein the control unit is adapted and structured to
a) determine if several of the foodstuffs can be cooked in one of the cooking devices at least partly concurrently,
b) depending on a), allocate the foodstuffs to the cooking devices, and
c) output, on the output device, which of the foodstuffs have to be cooked in which cooking devices.

The control unit is adapted and structured to
a) determine if several of the foodstuffs can be cooked in one of the cooking devices at least partly concurrently,
b) depending on a), allocate the foodstuffs to the cooking devices, and
c) output, on the output device, which of the foodstuffs have in which cooking devices.

Such an apparatus has the advantage that the foodstuffs can be efficiently distributed to the cooking devices. By determining if at least two of the foodstuffs can be cooked in one of the cooking devices at least partly concurrently allows to reduce the number of needed cooking devices. Hence, a low power consumption results, only a few cooking devices have to be cleaned after cooking, or if more foodstuffs than cooking devices are available, a simultaneous cooking of all foodstuffs is still possible.

A cooking device is understood to be a cooking unit which has a single cooking atmosphere or chamber. A cooking device could be an oven with a single cooking chamber in which a certain air temperature can be set.

Furthermore, in said data storage, cooking parameters for the cooking devices may be assigned to each of the at least two foodstuffs. In particular, the cooking parameters comprise a certain value and/or a value interval.

In that case the method or apparatus may determine if the at least two foodstuffs can be concurrently cooked in a common cooking device by comparing the parameters of the at least two foodstuffs.

The availability of cooking parameters for different cooking devices for different foodstuffs allows the control unit to compare the cooking conditions of the individual foodstuffs and to determine, depending on this comparison, which foodstuffs can be cooked in the same cooking device.

By declaring value intervals within which the respective foodstuff can be cooked, the probability can be increased that two value intervals of two foodstuffs overlap and therefore both foodstuffs can be cooked in the same cooking atmosphere or in the same cooking device, respectively.

Advantageously, after allocating the foodstuffs to the cooking devices, the control unit can output, via the output device, which cooking parameters are used for cooking in the respective cooking devices. Alternatively, the control unit can set the cooking parameters directly at the respective cooking devices via a communication device.

Advantageously, a priority value is assigned to the foodstuffs in the storage device, wherein the priority value is indicative of which is a preferred cooking device for the respective foodstuff. This has the advantage that the control unit can allocate a foodstuff more a more optimized manner to the cooking devices if the foodstuff can be cooked in different cooking devices. For example, cooking a vegetable in a steamer leads to a better result as compared to an oven, and therefore a higher priority value is assigned to this vegetable for the steamer.

Advantageously, the control unit is adapted and structured to assign the foodstuffs that can be cooked at least partly concurrently in the same cooking device to at least one group of foodstuffs. In particular, one of the at least one generated groups can be allocated to at least one of the cooking devices.

Furthermore, the control unit can be adapted and structured to allocate foodstuffs that cannot be assigned to at least one of the at least one group, to a cooking device, in particular to a hob, to which no group is allocated.

In a second aspect, the invention relates to a method for preparing at least two foodstuffs by means of an apparatus comprising at least two cooking devices, wherein the apparatus comprises an input device for specifying at least two foodstuffs,
wherein the method comprises the steps of
a) determining, by means of said control unit, if at least two of the foodstuffs can be cooked at least partly concurrently in one of the at least two cooking devices,
b) allocating, by means of said control unit, in dependence of a result of said step a), the foodstuffs to the at least two cooking devices, and
c) outputting, by means of said control unit, via the output device, which of the at least two foodstuffs have to be cooked in which cooking device or in which cooking devices.

BRIEF DESCRIPTION OF THE DRAWINGS

Further embodiments, advantages and applications of the invention arise from the dependent claims and the following description according to the figures, which show:

DESCRIPTION OF THE PREFERRED EMBODIMENTS

Figures 1, 2:
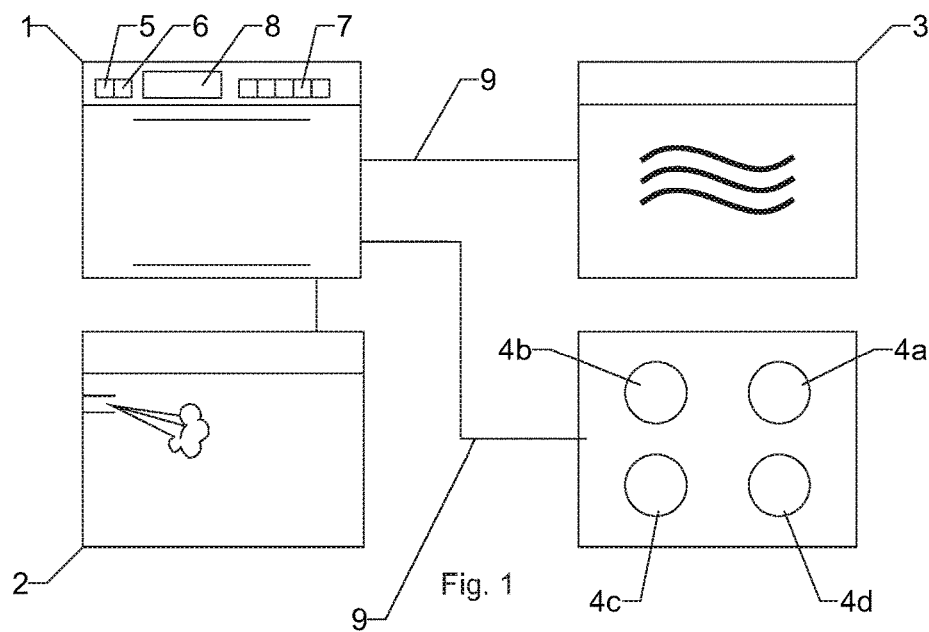
FIG. 1—an apparatus having seven cooking devices, and
FIG. 2—an assignment of cooking parameters to different cooking devices.

In FIG. 1, an apparatus having seven cooking devices is shown. The apparatus comprises an oven 1, a steamer 2, a microwave device 3, and a hob with four hotplates 4a-4d, wherein each hotplate 4a-4d is defined as a single cooking device since different foodstuffs can be cooked with different cooking conditions on each hotplate.

Furthermore, the apparatus comprises a control unit 5 (e.g. a microprocessor with associated program memory for executing programmed instructions in order to carry out the steps as described herein), a data storage 6 (which is considered to form part of the control unit 5), an input device 7, and an output device 8. In the present embodiment, these components are arranged on the oven 1. By means of the input device 7, the user can specify to the control unit 5 which foodstuffs should be cooked with the available cooking devices. After allocating the individual foodstuffs to the cooking devices, the control unit 5 outputs, via the output unit 8, which foodstuffs have to be cooked in which cooking devices. Furthermore, the cooking parameters at which the cooking devices are operated can also be output.

The control unit can also directly communicate the cooking parameters to the individual cooking devices via a communication device 9 (e.g. including an interface and a wire-bound or wireless connection) and start the cooking devices at a desired time.

FIG. 2 shows the contents of the data in data storage 6. Cooking parameters for different cooking devices are assigned to different foodstuffs in a tabular manner. In the first column from left, a priority value 10 is assigned to each foodstuff, which specifies with which cooking device the foodstuff has preferably to be cooked. The priority values 10 specify in which cooking device each foodstuff should preferably be cooked if several cooking devices are available.

Furthermore, several priority values 10 may be assigned to each foodstuff such that not only the preferred cooking device is specified, but such that the available cooking devices are prioritised order of preference.

In the following, the operation of the apparatus is to be described in more detail, with reference to several foodstuff combinations. All cooking devices of FIG. 1 are available to the user for the following examples.

For example, the user wants to cook a chicken with a cauliflower. The control unit determines, by reference to the table of FIG. 2, which is stored in the data storage 6, that the chicken and the cauliflower can be cooked concurrently in the steamer 2 in the temperature interval of 80-100° C. Hence, two foodstuffs can be cooked with only one single cooking device.

In the second example, the user wants to bake bread and to cook fish fillet and cauliflower concurrently. In this case, it is possible to bake the bread and cook the fish fillet together at 220° in the oven 1, or to cook the fish fillet and the cauliflower together at 80-90° C. in the steamer 2 or with a power of 450-650 W in the microwave device 3. Since the priority value 2 is assigned to the fish fillet, i.e. the fish fillet should preferably be cooked in the steamer 2, the control unit 5 allocates the fish fillet and the cauliflower to the steamer 2. In this case, the steamer 2 is operated at a temperature of 80-90° C. The bread cannot be baked in such a steam atmosphere. The bread has the priority value 1, for which reason the control unit allocates the bread to the oven 1 and not to the microwave 3. According to this, three foodstuffs can be cooked in only two cooking devices.

In a third example, the user wants to cook a bratwurst and carrots and to bake a bread. The control unit does not recognize overlapping temperature intervals of the individual foodstuffs for a certain cooking device. Therefore, according to the foodstuffs' priority values, the bread is allocated to the oven 1, the carrots are allocated to the steamer 2, and the bratwurst is allocated to the hob 4a-4d.

For the allocation, the control unit defines, for each cooking device, a group. The foodstuffs are assigned to these groups. Afterwards, this group assignment can be output via the output device 8.

If it is intended to finish the cooking of all foodstuffs at the same time, then the control unit may output at which times which foodstuffs have to be placed into which cooking devices. If several foodstuffs are cooked in one single cooking device, then the foodstuffs can be placed into the cooking device at different times.

Control unit 5 can be part of one of the cooking devices 1-4, as shown in FIG. 1, or it may be an independent device of the apparatus.

While preferred embodiments of the invention have been described in this application, it is clearly noted that the invention is not restricted to them and may be carried out in other ways within the scope of the following claims.

What is claimed is:

1. An apparatus for preparing at least two foodstuffs comprising:
   at least two cooking devices, each cooking device having its own cooking chamber or atmosphere;
   at least one control unit with a data storage,
   at least one input device for specifying the at least two foodstuffs to be cooked,
   at least one output device, and
   a communication device, by means of which cooking parameters can be communicated to the respective cooking devices from the control unit for controlling the at least two cooking devices,
   wherein the control unit is adapted and structured to:
   a) determine if several of the foodstuffs can be cooked in one of the cooking devices at least partly concurrently,
   b) allocate the foodstuffs to the cooking devices in dependence upon the determination made in step a),
   c) output, on the output device, which of the foodstuffs, as allocated are to be cooked in which of the cooking devices, and
   d) control the operation of the cooking devices according to the output through the communication device to cause foodstuffs to be cooked in one or more of the cooking devices according to the allocation determined by the control unit at steps a) and b).

2. The apparatus of claim 1, wherein said data storage holds cooking parameters for the cooking devices assigned to each of the at least two foodstuffs.

3. The apparatus of claim 2 wherein said control unit is adapted and structured to determine if the at least two foodstuffs can be concurrently cooked in a common cooking device by comparing the parameters of the at least two foodstuffs.

4. The apparatus of claim 3, wherein the cooking parameters comprise a certain value and/or a value interval.

5. The apparatus of claim 1, wherein said data storage comprises priority values assigned to the foodstuffs, wherein each priority value is indicative of which cooking device is a preferred cooking device for the respective foodstuff.

6. The apparatus of claim 5, wherein the control unit is adapted and structured to allocate the at least two foodstuffs to the cooking devices in dependence of said priority values.

7. The apparatus of claim 1, wherein the control unit is adapted and structured to assign the foodstuffs that can be cooked at least partly concurrently in the same cooking device to at least one group of foodstuffs.

8. The apparatus of claim 7, wherein the control unit is adapted and structured to allocate at least one of the at least one generated group to at least one of the cooking devices.

9. The apparatus of claim 8, wherein the control unit is adapted and structured to allocate foodstuffs that cannot be assigned to at least one of the at least one group, to a cooking device to which no group is allocated.

10. The apparatus of claim 8, wherein the control unit is adapted and structured to allocate foodstuffs that cannot be assigned to at least one of the at least one group, to a cooking device in the form of a hob to which no foodstuff is allocated.

11. The apparatus of claim 1 wherein said cooking devices comprise at least one of an oven, a steamer, a microwave device, a combination cooking device, and a hob.

12. A method for preparing at least two foodstuffs by means of an apparatus comprising at least two cooking devices, wherein the apparatus comprises an input device for specifying at least two foodstuffs, at least one control unit with a data storage, and an output device
wherein the method comprises the steps of:
a) determining, by means of said control unit, if at least two of the foodstuffs can be cooked at least partly concurrently in one of the at least two cooking devices,
b) allocating, by means of said control unit, in dependence upon the determination made in step a), the foodstuffs to be cooked in which of the at least two cooking devices,
c) outputting, by means of said control unit, via the output device, which of the at least two foodstuffs are to be cooked in which cooking device in dependence upon the step of allocating in step b), and
controlling the operation of the at least two cooking devices according to the outputting of step c) to cause foodstuffs to be cooked in one or more of the cooking devices according to the allocating of step b).

13. The method of claim 12, wherein the data storage stores cooking parameters assigned to the foodstuffs for the at least two cooking devices, and wherein said method comprises the step of determining if the at least two foodstuffs can be concurrently cooked in a common cooking device by comparing the parameters of the at least two foodstuffs.

14. The method of claim 13 wherein the cooking parameters comprise a certain value and/or a value interval.

15. The method of claim 13 wherein a priority value is assigned to the at least two foodstuffs in the data storage, wherein the priority value is indicative of which cooking device is a preferred cooking device for the respective foodstuff.

16. The method of claim 15 comprising the step of allocating, by means of said control unit, the at least two foodstuffs to the cooking devices in dependence of said priority value.

17. The method of claim 12, comprising the step of allocating at least two foodstuffs that can be cooked concurrently to the same cooking device.

18. The method of claim 17, comprising step of allocating foodstuffs that cannot be concurrently cooked with at least one of the other foodstuffs to a cooking device to which no foodstuff is allocated.

19. The method of claim 17, comprising step of allocating foodstuffs that cannot be concurrently cooked with at least one of the other foodstuffs to a cooking device in the form or a hob, to which no foodstuff is allocated.

20. The method of claim 12 wherein said devices comprise at least one of an oven, a steamer, a microwave device, a combination cooking device, and a hob.

* * * * *